United States Patent
Kooriyama

(10) Patent No.: US 7,600,463 B2
(45) Date of Patent: Oct. 13, 2009

(54) OIL PRESSURE SUPPLY CIRCUIT FOR INDUSTRIAL VEHICLE

(75) Inventor: Masayuki Kooriyama, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 259 days.

(21) Appl. No.: 11/843,319

(22) Filed: Aug. 22, 2007

(65) Prior Publication Data

US 2008/0060354 A1 Mar. 13, 2008

(30) Foreign Application Priority Data

Sep. 12, 2006 (JP) ............................. 2006-246610

(51) Int. Cl.
*F15B 13/06* (2006.01)
*F16D 31/02* (2006.01)

(52) U.S. Cl. ......................................... 91/516; 60/422

(58) Field of Classification Search .................. 60/420, 60/422; 91/516
See application file for complete search history.

(56) References Cited

U.S. PATENT DOCUMENTS

| | | | |
|---|---|---|---|
| 4,759,182 A | | 7/1988 | Haarstad |
| 5,179,835 A | * | 1/1993 | Casey et al. .................. 91/516 |
| 5,620,026 A | * | 4/1997 | Stephenson et al. ........... 91/516 |
| 5,927,072 A | * | 7/1999 | Vannette ...................... 91/516 |
| 7,353,649 B2 | * | 4/2008 | Yoshida et al. ................ 60/422 |
| 2004/0149498 A1 | | 8/2004 | Nakashima |

FOREIGN PATENT DOCUMENTS

| | | |
|---|---|---|
| DE | 35 40 236 A1 | 6/1986 |
| JP | 1-183426 A | 7/1989 |
| JP | 4-228371 A | 8/1992 |
| JP | 5-178223 A | 7/1993 |
| JP | 8-192758 A | 7/1996 |
| JP | 2004-196110 A | 7/2004 |

\* cited by examiner

*Primary Examiner*—Michael Leslie
(74) *Attorney, Agent, or Firm*—Foley & Lardner LLP

(57) ABSTRACT

A priority flow rate control valve (4) increases a distribution ratio of pressurized oil to a power steering device (1) of a fork-lift track via a power steering oil passage (9) as a differential pressure between a power steering pressure (PS) in the power steering oil passage (9) and a pilot pressure (LS) decreases. A load signal port (24) which outputs a pressure indicative of a load exerted on the power steering device (1) and the power steering oil passage (9) are connected via two orifices (26A, 26B), and the pilot pressure (LS) pressure is extracted from a point between the two orifices (26A, 26B). By providing a bypass passage (31, 35) which bypasses one of the two orifices (26A, 26B) and a bypass valve (30) which opens and closes the bypass passage (26A, 26B), a response of the priority flow rate control valve (4) can be increased temporarily.

8 Claims, 7 Drawing Sheets

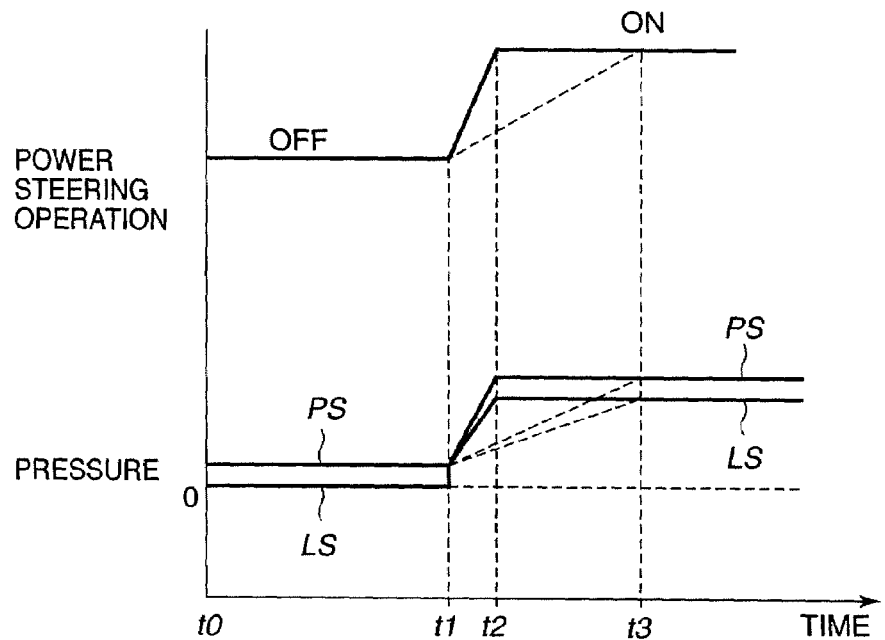
FIG. 3A  POWER STEERING OPERATION
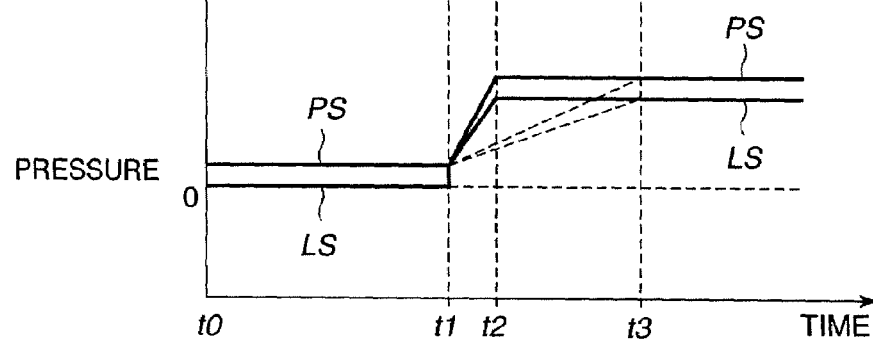
FIG. 3B  PRESSURE
FIG. 4A  CARGO HANDLING OPERATION
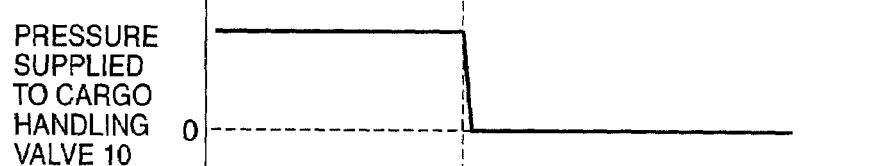
FIG. 4B  PRESSURE SUPPLIED TO CARGO HANDLING VALVE 10
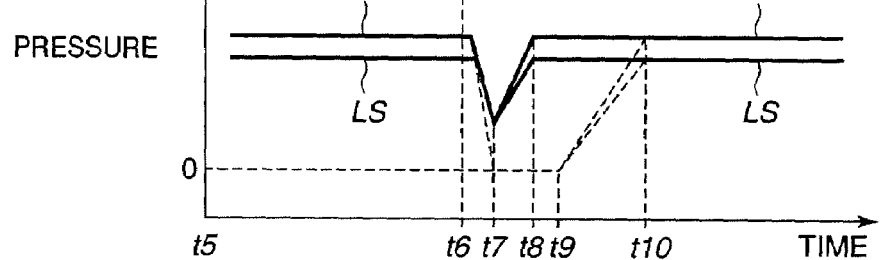
FIG. 4C  PRESSURE

OIL PRESSURE SUPPLY CIRCUIT FOR INDUSTRIAL VEHICLE

FIELD OF THE INVENTION

This invention relates to an oil pressure supply circuit used in the steering and cargo handling of an industrial vehicle such as a fork-lift truck.

BACKGROUND OF THE INVENTION

U.S. Pat. No. 4,759,182 and JP 2004-196110A published by the Japan Patent Office in 2004 disclose an oil pressure supply circuit which drives a power steering device and a cargo handling device of a fork-lift truck using a single oil pump.

In both prior art circuits, a priority flow rate control valve is provided for distributing pressurized oil from the oil pump to the power steering device preferentially and distributing excess oil to the cargo handling device. For this purpose, a load pressure on the power steering device is caused to act on a valve spool of the priority flow rate control valve via a pilot passage as a pilot pressure and a distribution ratio of pressurized oil to the power steering device is increased as the pilot pressure increases.

The pilot pressure is introduced to the pilot passage via an orifice. An oil pressure supplied to the power steering device is also introduced to the pilot passage via another orifice. The valve spool is supported elastically by a spring A in the same direction as the pilot pressure acting on the valve spool. On the other hand, the oil pressure supplied to the power steering device acts on the valve spool in the opposite direction to the pilot pressure. The valve spool distributes pressurized oil to the power steering device and the cargo handling device in a distribution ratio determined according to the balance of forces acting on the valve spool.

SUMMARY OF THE INVENTION

In both devices, the flow cross sectional area of the orifices connected to the pilot passage is made small to avoid abrupt variation in the pilot pressure, thereby ensuring the stability of the action of the priority flow rate control valve.

However, a construction of the pilot passage in this manner may introduce an unfavorable effect depending on the operation state of the fork-lift truck.

When the operation of the cargo handling device is terminated in a state where the power steering device and the cargo handling device are both operative, the pressure used for operating the cargo handling device is released to an oil tank and a discharge pressure of the oil pump decreases. As a result, the oil pressure supplied to the power steering device also decreases, and the priority flow rate control valve tends to displace the valve spool in a direction for increasing the distribution ratio of pressurized oil to the steering device.

In this state, however, the pilot passage, the oil flow rate of which is limited by the orifices, cannot supply a sufficient amount of oil to an oil chamber facing the valve spool to enable rapid displacement of the valve spool, and hence recovery of the decreased oil pressure supplied to the power steering device takes a long time. If an operator of the fork-lift truck operates a steering wheel of the fork-lift truck in this state, the power steering device cannot supply an adequate assisting power for steering the fork-lift truck, and hence a so-called kickback phenomenon occurs in response to the steering operation by the operator.

Further, when a steering operation is commenced in a state where the power steering device and the cargo handling device are not operative, the priority flow rate control valve tends to displace the valve spool in a direction for increasing the distribution ratio of pressurized oil to the power steering device. However, also in this state, the pilot passage, the flow rate of which is limited by the orifices, prevents rapid displacement of the valve spool, and hence a delay is generated until the oil pressure supplied to the power steering device builds up. As a result, the operator may feel as if the steering wheel is hindered from rotating.

It is therefore an object of this invention to ensure a rapid increase in the oil pressure supplied from the priority flow rate control valve to the power steering device when required.

In order to achieve the above object, this invention provides an oil pressure supply circuit which supplies pressurized oil to a power steering device and a cargo handling device of an industrial vehicle. The oil pressure supply circuit comprises an oil pump which discharges pressurized oil, a power steering oil passage which supplies pressurized oil to the power steering device, a load signal port which outputs a load pressure exerted on the power steering device, a signal pressure passage which connects the load signal port and the power steering oil passage, and a priority flow rate control valve which distributes the pressurized oil discharged by the oil pump preferentially to the power steering oil passage, and distributes excess oil to the cargo handling device.

The load signal port is released to an oil tank when the power steering device is not operative. The signal pressure passage comprises a first orifice and a second orifice which are disposed in series such that the first orifice is disposed nearer to the load signal port than the second orifice. The priority flow rate control valve is configured to increase a distribution ratio of the pressurized oil to the power steering oil passage as a differential pressure between the power steering oil passage and the signal pressure passage between the first orifice and the second orifice decreases.

The oil pressure supply circuit further comprises a bypass passage which bypasses one of the first orifice and the second orifice, and a bypass valve which opens and closes the bypass passage.

The details as well as other features and advantages of this invention are set forth in the remainder of the specification and are shown in the accompanying drawings.

BRIEF DESCRIPTION OF THE DRAWINGS

FIGS. 3A and 3B are timing charts describing pressure variation in the oil pressure supply circuit when a steering operation is initiated in a state where neither cargo handling nor steering is underway.

FIGS. 4A-4C are timing charts describing pressure variation in the oil pressure supply circuit when cargo handling is terminated in a state where cargo handling and steering operation are both underway.

DESCRIPTION OF THE PREFERRED EMBODIMENTS

Figure 1:
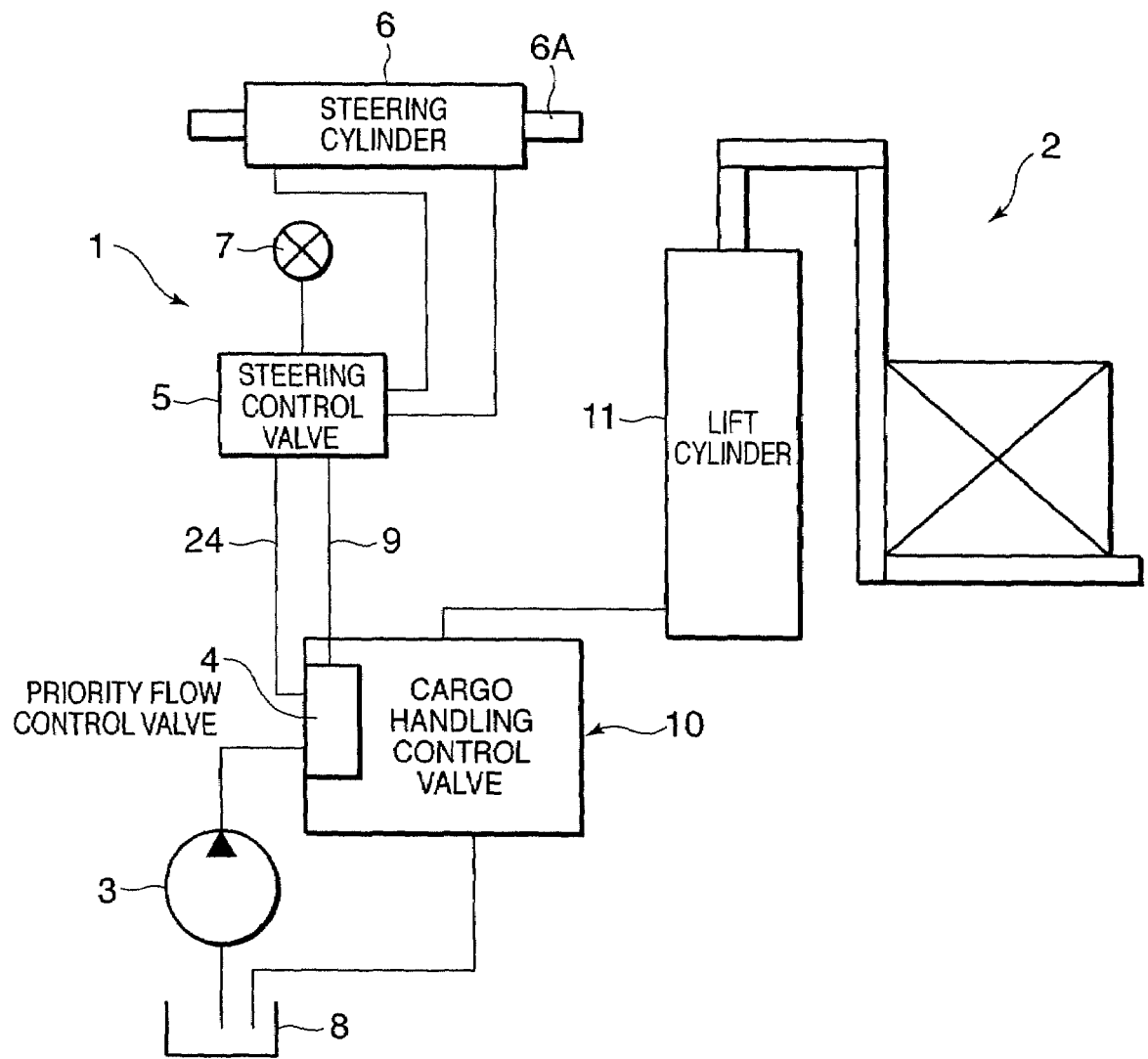
FIG. 1 is a schematic diagram of a power steering device and a cargo handling device of a fork-lift truck.

Referring to FIG. 1 of the drawings, a fork-lift truck serving as an industrial vehicle is provided with a full oil power steering device 1 and a cargo handling device 2.

The power steering device 1 comprises a steering cylinder 6 which turns the steered wheels of the vehicle. The steering cylinder 6 is a device known in the art and has two oil chambers. A piston rod 6A is displaced by the oil supplied to one oil chamber, and the steered wheels of the vehicle are thereby turned to the right or left by the rotation of a knuckle arm connected to the piston rod 6A, not shown. The oil discharged by the oil pump 3 is supplied to the steering cylinder 6 via the priority flow rate control valve 4 and a steering control valve 5.

The cargo handling device 2 comprises a lift cylinder 11 which raises and lowers the fork of the fork-lift truck by oil pressure, and a tilt cylinder which tilts the mast of the fork-lift truck forward or backward by oil pressure. The lift cylinder 11 has a single oil chamber. The fork is lifted according to the supply of oil to the oil chamber and the fork is lowered as the oil chamber discharges oil. The tilt cylinder comprises a front-tilt oil chamber which tilts a mast supporting the fork forward, and a rear-tilt oil chamber which tilts the mast backward.

Oil discharged by the oil pump 3 is supplied to the lift cylinder 11 and tilt cylinder via the priority flow rate control valve 4 and a cargo handling control valve 10.

The oil pump 3 is usually driven by an internal combustion engine for driving the vehicle, the internal combustion engine maintaining the minimum discharge flow rate required for operating the power steering device 1 even in an idle state. The rotation speed of the internal combustion engine is controlled according to the operation of the cargo handling device 2. Due to this control of the engine rotation speed, the oil pump 3 increases the discharge flow rate during an operation of the cargo handling device 2 and reduces the discharge flow rate when the cargo handling device 2 stops operating.

The priority flow rate control valve 4 preferentially supplies oil at a flow rate required by the power steering device 1 from the discharge oil of the oil pump 3 to the power steering device 1, and supplies the remaining oil to the cargo handling control valve 10.

The steering control valve 5 operates according to the rotation of the steering wheel 7, and supplies oil discharged by the oil pump 3 via the priority flow rate control valve 4 to one of the two oil chambers of the steering cylinder 6.

Figure 2:
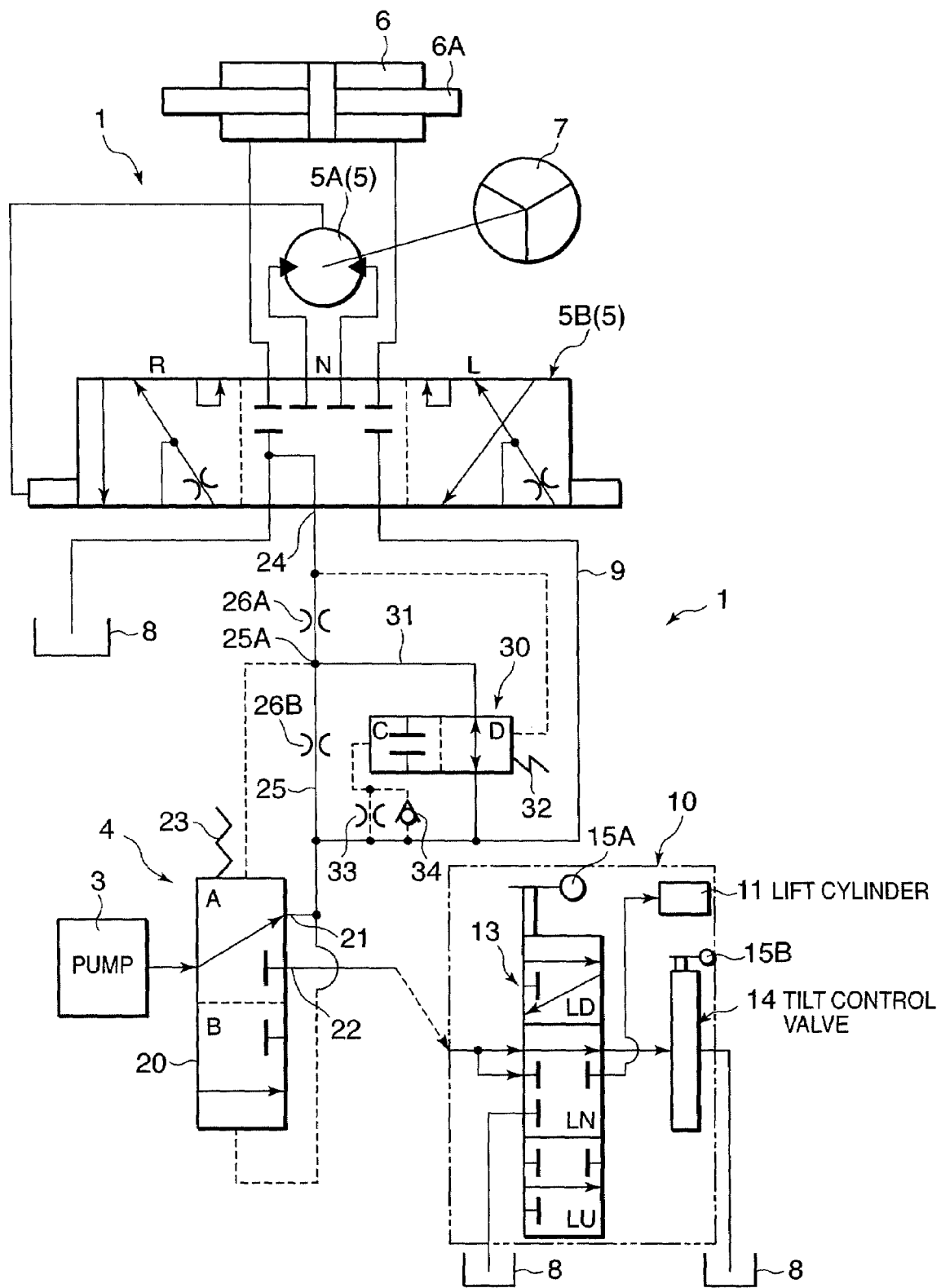
FIG. 2 is an oil circuit diagram of an oil pressure supply circuit according to this invention for the power steering device and the cargo handling device.

Next, referring to FIG. 2, the priority flow rate control valve 4 comprises a priority outflow port 21 and an overflow outflow port 22. The steering control valve 5 is connected to the priority outflow port 21 and the cargo handling control valve 10 is connected to the overflow outflow port 22.

The steering control valve 5 comprises an orbit pump 5A which is a metering device operating in response to the rotation of the steering wheel 7, and a switching valve 5B. The switching valve 5B supplies pressurized oil supplied from the oil pump 3 via the priority flow rate control valve 4 to one of the two oil chambers of the steering cylinder 6 in accordance with the rotation direction of the steering wheel 7, or in other words in accordance with a steering direction, The orbit pump 5A controls the flow rate of pressurized oil supplied to the steering cylinder 6 to correspond to the operation speed of the steering wheel 7, or in other words to correspond to a steering speed. The steering cylinder 6 is a double-rod type hydraulic cylinder and drives a piston rod 6A in a direction corresponding to the steering direction using the pressurized oil supplied from the steering control valve 5. A knuckle arm connected to the piston rod 6A steers the steered wheels of the fork-lift truck in accordance with the steering speed and the steering direction.

The switching valve 5B comprises a right steering section R, a left steering section L, and a neutral section N. The switching valve 5B is provided with ports connected respectively to two oil ports of the orbit pump 5A and two oil chambers of the steering cylinder 6. The switching valve 5B is also provided with ports connected respectively to the oil tank 8, a power steering oil passage 9, and a load signal port 24. The switching valve 5B connects and disconnects these ports by applying one of the sections R, L, and N, The power steering oil passage 9 is permanently connected to the priority outflow port 21 of the priority flow rate control valve 4. The load signal port 24 is permanently connected to an end of a signal pressure passage 25 in which a first orifice 26A and a second orifice 26B are provided in series. The first orifice 26A is disposed in a position nearer to the load signal port 24 than the second orifice 26B. Another end of the signal pressure passage 25 is connected to the power steering oil passage 9. The diameter of the flow cross sectional area of the first orifice 26A and the second orifice 26B is set to be small; 0.7 millimeters, for example.

The switching valve 5B maintains the neutral section N when the steering wheel 7 is not operated. In the neutral section N, the switching valve 5B shuts off pressurized oil supply from the power steering oil passage 9 to the orbit pump 5A, and drains oil supplied to the load signal port 24 from the signal pressure passage 25 to the oil tank 8 such that a pilot pressure LS which appears at a branch point 25A located between the two orifices 26A, 26B becomes zero.

When the steering wheel 7 is rotated in the right or left direction, the switching valve 5B switches to the steering section R or the left steering section L from the neutral section N in accordance with the steering direction. In the steering section R or the left steering section L, the switching valve 5B supplies pressurized oil from the power steering oil passage 9 to the orbit pump 5A. The orbit pump 5A controls the flow rate of the pressurized oil supplied from the power steering oil passage 9 to correspond to the steering speed and supplies flow-rate-regulated oil to one of the oil chambers of the steering cylinder 6 corresponding to the steering direction. The switching valve 5B outputs an oil pressure supplied to the orbit pump 5A as a load signal pressure to the load signal port 24. The pressure of the supplied oil to the orbit pump 5A, or in other words the load signal pressure, depends on the steering speed and the operation load of the steering cylinder 6.

The cargo handling control valve 10 comprises a lift control valve 13 for controlling the lift cylinder 11 and a tilt control valve 14 for controlling the tilt cylinder. The lift control valve 13 is operated by the lift control lever 15A. The tilt control valve 14 is operated by the tilt control lever 15B. With respect to the flow of pressurized oil supplied from the overflow outflow port 22, the lift control valve 13 is disposed upstream of the tilt control valve 14. This order can be reversed.

The lift control valve 13 comprises a neutral section LN, an ascending section LU, and a descending section LD. In the neutral section LN, the lift control valve 13 shuts off communication between the overflow outflow port 22 and the lift cylinder 11 while connecting the overflow outflow port 22 to the tilt control valve 14. In the ascending section LU, the lift control valve 13 connects the overflow outflow port 22 to the lift cylinder 11 while shutting off the connection between the overflow outflow port 22 and the tilt control valve 14. In the descending section LD, the lift control valve 13 connects the lift cylinder 11 to the oil tank 8 while connecting the overflow outflow port 22 to the tilt control valve 14. The lift control valve 13 applies these three sections selectively in response to the operation of the lift control lever 15A.

The tilt control valve 14 comprises a neutral section, a forward tilting section, and a backward tilting section. In the neutral section, the tilt control valve 14 shuts off the connection between the overflow outflow port 22 and the tilt cylinder while allowing the overflow outflow port 22 to drain pressurized oil to the oil tank 8. In the forward tilting section, the tilt control valve 14 connects a forward tilting chamber of the tilt cylinder to the overflow outflow port 22 via the lift control valve 13 while causing a backward tilting chamber of the tilt cylinder to drain oil to the oil tank 8. In the backward tilting section, the tilt control valve 14 connects the backward tilting chamber to the overflow outflow port 22 via the lift control valve 13 while causing the forward tilting chamber to drain oil to the oil tank 8. The tilt control valve 14 applies these three sections selectively in response to the operation of the tilt control lever 15B.

The priority flow rate control valve 4 comprises a valve spool 20 which distributes pressurized oil from the oil pump 3 to the priority outflow port 21 and the overflow outflow port 22. The valve spool 20 distributes the pressurized oil to the priority outflow port 21 and the overflow outflow port 22 in a distribution ratio corresponding to its displacement position.

The valve spool 20 comprises a section A which supplies the pressurized oil to the power steering device 1 via the power steering passage 9 and a section B which supplies the pressurized oil to the cargo handling control valve 10. The valve spool 20 is biased by a spring 23 in a direction to apply the section A. A power steering pressure PS in the power steering oil passage 9 is applied to the valve spool 20 in an opposite direction to the biasing force of the spring 23 as a feedback pressure.

Further, the pilot pressure LS is led from the branch point 25A of the signal pressure passage 25 between the first orifice 26A and the second orifice 26B and applied to the valve spool 20 in the same direction as the biasing force of the spring 23. In this oil pressure supply circuit, the power steering device 1 is regarded as a main device while the cargo handling device 2 is regarded as an auxiliary device. According to the construction of the priority flow rate control valve 4 described above, the valve spool 20 displaces in a direction for increasing the application ratio of the section B so as to increase the distribution ratio of the pressurized oil to the cargo handling control valve 10, when the pressurized oil supplied to the power steering device 1 decreases.

The power steering device 1 provides a steering assist force to steer the steered wheels according to the steering speed. When the pressurized oil supply to the steering cylinder 6 becomes insufficient with respect to the required steering assist force represented by the rotation speed of the steering wheel 7, the switching valve 5B in the right steering section R or the left steering section L increases the load signal pressure so as to cause the valve spool 20 to displace in a direction for increasing the application ratio of the section A.

The branch point 25A of the signal pressure passage 25 between the first orifice 26A and the second orifice 26B is connected to the power steering oil passage 9 via a bypass passage 31 which bypasses the second orifice 26B. A bypass valve 30 is provided in the bypass passage 31. The bypass valve 30 comprises a valve spool provided with a disconnecting section C and a connecting section D. The power steering pressure PS in the power steering oil passage 9 is applied to an end of the valve spool in a direction to apply the disconnecting section C. The load signal pressure in the load signal port 24 and a biasing force of a spring 32 are applied to another end of the valve spool in a direction to apply the connecting section D.

As a result, when a differential pressure between the power steering pressure PS in the power steering oil passage 9 and the load signal pressure in the load signal port 24 is smaller than the biasing force of the spring 32, the bypass valve 30 applies the connecting section D. In the connecting section D, the bypass valve 30 connects the branch point 25A of the signal pressure passage 25 between the first orifice 26A and the second orifice 26B directly to the power steering oil passage 9. When, on the other hand, the differential pressure between the power steering pressure PS and the load signal pressure in the load signal port 24 is greater than the biasing force of the spring 32, the bypass valve 30 applies the disconnecting section C such that the branch point 25A is connected to the power steering oil passage 9 via the second orifice 26B.

A damping orifice 33 is provided in a pressure line which leads the power steering pressure PS from the power steering oil passage 9 to the bypass valve 30. The damping orifice 33 functions to cause a delay in the variation of the pressure applied to the valve spool of the bypass valve 30 with respect to the variation in the power steering pressure PS in the power steering oil passage 9, thereby stabilizing the motion of the bypass valve 30. Further, in parallel with the damping orifice 33, a check valve 34 allows oil to flow from an end of the valve spool of the bypass valve 30 towards the power steering oil passage 9 while preventing oil from flowing in the opposite direction. According to the functions of the check valve 34 and the damping orifice 33, the bypass valve 30 has a characteristic to displace rapidly from the disconnecting section C to the connecting section D, but displace slowly from the connecting section D to the disconnecting section C.

Among the components of the oil pressure supply circuit described above, the components other than the bypass passage 31 and the bypass valve 30 belong to the prior art.

When an ignition key of the fork-lift truck is turned on to start an internal combustion engine, an operation of the oil pump 3 is initiated and pressurized oil discharged from the oil pump 3 is supplied to the priority flow rate control valve 4. The priority flow rate control valve 4 distributes the pressurized oil to the power steering device 1 and the cargo handling control valve 10.

If the steering wheel 7 is not rotated in this state, the switching valve 5B is kept in the neutral section N, thereby shutting off supply of the pressurized oil from the priority flow rate control valve 4 to the orbit pump 5A via the power steering oil passage 9. Accordingly, the oil flow rate in the orbit pump 5A is zero liters per minute. On the other hand, the flow rate of pressurized oil supplied from the power steering oil passage 9 to the load signal port 24 via the signal pressure passage 25, which is finally drained to the oil tank 8, is 0.5-1.5 liters per minute.

Referring to FIGS. 3A and 3B, when the fork-lift truck is not engaged in cargo handling and a steering operation is not underway, the power steering pressure PS and the pilot pressure LS are maintained at constant values as indicated in FIG. 3B during the time period from t0 to t1. In this state, the flow rate of pressurized oil supplied to the power steering device 1 is maintained at a minimum rate, and the load signal pressure in the load signal port 24 takes a minimum value.

In this state, the power steering pressure PS in the power steering oil passage 9 is higher than the load signal pressure in the load signal port 24 due to a pressure loss in the signal pressure passage 25. The difference therebetween is approximately 0.5 megapascals (MPa). As a result, the valve spool 20 in the priority flow rate control valve 4 is biased to increase the application ratio of section B, and most of the pressurized oil discharged from the oil pump 3 is supplied to the cargo handling control valve 10. In this state, the lift control valve 13 of the cargo handling control valve 10 is in the neutral section LN, or in other words the lift cylinder 11 is inoperative. The tilt control valve 14 is also in the neutral section. The pressurized oil supplied to the cargo handling control valve 10 therefore passes through the lift control valve 13 and the tilt control valve 14 and is recirculated to the oil tank 8.

After the fork-lift truck starts to run, the rotation speed of the internal combustion engine increases, and a discharge flow rate of the pressurized oil from the oil pump 3 increases. Consequently, the flow rate of recirculated oil from the priority flow rate control valve 4 to the oil tank 8 via the cargo handling control valve 10 increases.

At the time t1 when the fork-lift truck is traveling, the operator operates the steering wheel 7 and the switching valve 5B is caused to apply the right steering section R or the left steering section L corresponding to the steering direction. The switching valve 5B then supplies the pressurized oil from the power steering oil passage 9 to the orbit pump 5A, such that the pressurized oil is supplied to one of the oil chambers of the steering cylinder 6 corresponding to the steering direction at a flow rate corresponding to the operation speed of the steering wheel 7. The switching valve 5B, in either of the right steering section R and the left steering section L, connects the power steering oil passage 9 and the load signal port 24 via an orifice provided in each of the sections R and L. Accordingly, the load signal pressure in the load signal port 24 rises.

An increase in the load signal pressure in the load signal port 24 is transferred to the valve spool 20 of the priority flow rate control valve 4 via the load signal pressure passage 25 as the pilot pressure LS. An increase in the pilot pressure LS causes the valve spool 20 of the priority flow rate control valve 4 to displace in a direction for increasing the application ratio of the section A. As a result, the priority flow rate control valve 4 increases the distribution ratio of pressurized oil to the power steering device 1.

In an oil pressure supply circuit which is not provided with the bypass passage 31 and the bypass valve 30, the increase rate of the pilot pressure LS at the branch point 25A which is applied to the valve spool 20 is limited due to a delay effect brought about by the first orifice 26A and the second orifice 26B. As a result, the displacement speed of the valve spool 20 for increasing the application ratio of the section A in the priority flow rate control valve 4 is low, and the flow rate of the pressurized oil supplied to the power steering device 1 increases only gradually. Accordingly, the power steering pressure PS in the power steering oil passage 9 increases only gradually, as shown by a broken line in FIG. 3B. According to this pressure variation characteristic, the oil pressure supply circuit without the bypass passage 31 and the bypass valve 30 cannot supply sufficient pressurized oil to the steering cylinder 6 to generate a steering assist force corresponding to the steering speed. As a result, the operator who proceeds to rotate the steering wheel 7 in this state may feel as if the steering wheel 7 is hindered from rotating. Since the increase in the power steering pressure PS is only gradual as shown by the broken line in FIG. 3B, the power steering pressure PS does not build up until a time t3, and the actual steering operation is also delayed as shown by the broken line in FIG. 3A. This steering characteristic corresponds to the problem of the prior circuits, which was described earlier.

In the oil pressure supply circuit according to this invention, which is provided with the bypass passage 31 and the bypass valve 30, when the steering wheel 7 is inoperative, the bypass valve 30 is kept in the disconnecting section C due to a large differential pressure between the power steering pressure PS in the power steering oil passage 9 and the load signal pressure in the load signal port 24. This state is substantially identical to that of the oil pressure supply circuit which is not provided with the bypass passage 31 and the bypass valve 30.

In contrast, when the operator proceeds to operate the steering wheel 7, the switching valve 5B applies one of the right steering section R and the left steering section L in accordance with the steering direction, and the power steering oil passage 9 is connected to the load signal port 24. Upon connection to the power steering oil passage 9, the load signal pressure in the load signal port 24 increases and the differential pressure between the steering pressure PS and the pilot pressure LS diminishes. Following the variation in the differential pressure, the bypass valve 30 switches from the disconnecting section C to the connecting section D promptly, since the check valve 34 which is disposed in parallel with the damping orifice 33 releases the oil pressure applied to the valve spool of the bypass valve 30 without resistance.

In the connecting section D of the bypass valve 30, the branch point 25A is connected directly to the power steering oil passage 9, and displacement of the valve spool 20 of the priority flow rate control valve 4 is free from the speed limitation imposed by the orifices 26A, 26B. Hence, the valve spool 20 displaces rapidly in the direction for increasing the application ratio of the section A. As a result, the steering pressure PS in the power steering oil passage 9 increases rapidly as shown by the solid line in FIG. 3B, to 7-8 MPa, for example. The power steering pressure PS is therefore built up at a time t2 which is much earlier than the time t3 as shown in FIG. 3A and the actual steering operation is started promptly. The operator therefore operates the steering wheel 7 without feeling a hindrance.

In a state where the switching valve 5B is in the right steering section R or the left steering section L, pressurized oil from the priority outflow port 21 is supplied to the orbit pump 5A through the power steering oil passage 9. The load signal pressure in the load signal port 24 is lower than the steering pressure PS in the power steering oil passage 9 due to pressure loss in the steering section R or L, and the differential pressure between the steering pressure PS and the load signal pressure increases as the flow rate in the power steering oil passage 9 increases. Due to this pressure characteristic, when the switching valve 5B is in the right steering section R or the left steering section L, the bypass valve 30 switches from the connecting section D to the disconnecting section C.

The power steering pressure PS in the power steering oil passage 9 is applied to an end of the valve spool of the bypass valve 30 via the damping orifice 33. Due to the damping effect of the damping orifice 33, the pressure applied to the end of the valve spool increases only gradually even when the power steering pressure PS increases rapidly. Switching of the bypass valve 30 from the connecting section D to the disconnecting section C is therefore performed gradually. This ensures rapid displacement of the valve spool 20 of the priority flow rate control valve 4 until the flow rate of the priority outflow port 21 is increased sufficiently.

When the operator operates the lift control lever 15A or the tilt control lever 15B for starting cargo handling after decelerating the fork-lift truck, a control amount of the control lever 15A (15b) is detected by a sensor, not shown, and the internal combustion engine is controlled on the basis of the control amount of the control lever 15A (15b). As a result of this control, the flow rate of pressurized oil supplied from the oil pump 3 to the priority flow rate control valve 4 may increase.

In this state, however, the priority flow rate control valve 4 does not increase the flow rate of the priority outflow port 21 as long as the load signal pressure in the load signal port 24 does not vary, but supplies an increased amount of the pressurized oil to the overflow outflow port 22 by increasing the application ratio of the section B. When the lift control lever 15A or the tilt control lever 15B is operated, therefore, a sufficient amount of pressurized oil corresponding to the control amount is supplied to the lift cylinder 11 or the tilt cylinder, and the cargo handling device 2 is operated at a speed corresponding to the control amount of the lift control lever 15A or the tilt control lever 15B.

Referring to FIGS. 4A-4C, in a time period from t5 to t6, cargo handling and a steering operation are performed in parallel. At the time t6 when cargo handling is terminated, or in other words operations of the lift control lever 15A and the tilt control lever 15B are both terminated, the internal combustion engine is controlled to decrease the rotation speed, and the flow rate of the pressurized oil supplied from the oil pump 3 to the priority flow rate control valve 4 decreases accordingly.

When the cargo handling device 2 is terminated, both the lift control valve 13 and the tilt control valve 14 are switched to the neutral section LN. When these valves are both switched to the neutral section LN, all the pressurized oil supplied to the cargo handling control valve 10 is recirculated to the oil tank 8. As a result, the pressure of the oil supplied to the cargo handling control valve 10 falls rapidly towards zero as shown in FIG. 4B. Since the priority outflow port 21 and the overflow outflow port 22 communicate with each other via a pump port of the priority flow rate control valve 4 connected to the oil pump 3, the discharge pressure of the oil pump 3 as well as the power steering pressure PS fall when the pressure of the oil supplied to the cargo handling control valve 10 falls.

The valve spool 20 of the priority flow rate control valve 4 displaces in a direction for increasing the application ratio of the section A when the power steering pressure PS acting as an upward force in FIG. 2 on an end of the valve spool 20 decreases. Accompanying this displacement, oil flows into a chamber facing the opposite end of the valve spool 20 from the load signal port 24 via the signal pressure passage 25. In the case of the oil pressure supply circuit which is not provided with the bypass passage 31 and the bypass valve 30, the flow rate of the oil flowing into the chamber is limited by the orifices 26A, 26B, thereby suppressing the displacement speed of the valve spool 20 to be low.

As a result, the line connecting the pump 3 to the overflow outflow port 22 in the section B of the valve spool 20 closes very slowly, during which the power steering pressure PS continues to be low. The steering pressure PS does not start to increase until a time t9, and the steering pressure PS in the power steering oil passage 9 and the load signal pressure in the load signal port 24 do not recover the values that were achieved before terminating the operation of the cargo handling device 2 until a time t10. If a steering operation is performed before the time t10, therefore, the switching valve 5B cannot supply sufficient pressurized oil to the steering cylinder 6 due to the low pressure in the power steering oil passage 9 and the operator may feel a kickback while operating the steering wheel 7.

In the oil pressure supply circuit according to this invention comprising the bypass passage 31 and the bypass valve 30, the valve spool of the bypass valve 30 displaces to the connecting section C according to a biasing force of the spring 32 when the differential pressure between the power steering pressure PS of the power steering oil passage 9 and the pilot pressure LS of the branch point 25A approaches zero due to decrease in the power steering pressure PS. In the connecting section D, the branch point 25A is directly connected to the power steering oil passage 9 without passing through the second orifice 26B. Along with this displacement of the valve spool of the bypass valve 30, oil in the oil chamber applying an oil pressure to the valve spool in a direction opposite to the displacement is discharged to the power steering oil passage 9. The oil is discharged rapidly without resistance through the check valve 34 disposed in parallel with the damping orifice 33.

When the bypass valve 30 has switched to the connecting section D, the valve spool 20 of the priority flow rate control valve 4 is free from the displacement speed limitation imposed by the first orifice 26A or the second orifice 26B, and hence displaces towards the section A rapidly. Oil is introduced without resistance into an oil chamber of the priority flow rate control valve 4 applying a force on the valve spool 20 in a direction for applying the section A from the bypass valve 30 which is in the connecting section D. Since the valve spool 20 displaces rapidly in a direction for increasing the application ratio of the section A in this way, the power steering pressure PS of the power steering oil passage 9 that has decreased begins to increase at a time t7 as shown in FIG. 4C. At a time t8, both the power steering pressure PS and the pilot pressure LS recover the state prior to termination of the operation of the cargo handling device 2. When terminating the operation of the cargo handling device 2, therefore, the magnitude of the decrease in the power steering pressure PS is suppressed to be small and the power steering pressure PS required by the power steering device 1 is recovered in a short time. Kickback is therefore unlikely to occur even if the power steering device 1 is operated immediately after terminating the operation of the cargo handling device 2.

When the power steering pressure PS in the power steering oil passage 9 has increased sufficiently, the flow rate in the power steering oil passage 9 as well as the flow rate in the load signal port 24 increase, and the differential pressure between the power steering oil passage 9 and the branch point 25A also increases. According to the increase in the differential pressure, the bypass valve 30 switches to the disconnecting section C, in which the second orifice 26B exerts a damping effect on the flow of the signal pressure passage 25. The power steering pressure PS in the power steering oil passage 9 that biases the valve spool of the bypass valve 30 in a direction for applying the disconnecting section C is also applied to the valve spool in the opposite direction via the damping orifice 33, and hence the bypass valve 30 switches to the disconnecting section C gradually. As a result, the displacement of the valve spool 20 of the priority flow rate control valve 4 in a direction for increasing the application ratio of the section B is not prevented until the flow rate in the priority outflow port 21 reaches the flow rate corresponding to the steering speed of the steering wheel 7.

In contrast, when the operation of the steering wheel 7 is terminated, the switching valve 5B is switched to the neutral section N such that the load signal port 24 is connected to the oil tank 8 and the load signal pressure decreases. Since the power steering pressure PS in the power steering oil passage 9 is maintained, the valve spool 20 of the priority flow rate control valve 4 displaces in a direction for increasing the application ratio of the section B, and most of the pressurized oil from the oil pump 3 is supplied to the cargo handling control valve 10 from the overflow outflow port 22 of the priority flow rate control valve 4.

In a case where only the cargo handling device 2 operates, the switching valve 5B is maintained in the neutral section N, and the oil flowing out from the load signal port 24 to the oil tank 8 is the only oil used by the power steering device 1. The flow rate of the oil supplied to the power steering device 1 is therefore a minimum value. Accordingly, the pilot pressure LS at the branch point 25A is low. Since the power steering pressure PS in the power steering oil passage 9 is maintained without falling, the valve spool 20 of the priority flow rate control valve 4 is biased in a direction for increasing the application ratio of the section B such that most of the pressurized oil from the oil pump 3 is supplied to the cargo handling control valve 10 via the overflow outflow port 2. When the lift control lever 15A and/or the tilt control lever 15B are operated in this state, the internal combustion engine increases the rotation speed in response to the operation amount of the lift control lever 15A and/or the tilt control lever 15B, and the flow rate of pressurized oil discharged from the oil pump 3 to the priority flow rate control valve 4 increases accordingly.

The pressurized oil is then supplied to the cargo handling control valve 10 at a flow rate corresponding to the control amount of the lift control lever 15A and/or the tilt control lever 15B so as to operate the cargo handling device 2 in a speed corresponding to the control amount of the lift control lever 15A and/or tilt control lever 15B.

Figure 5:
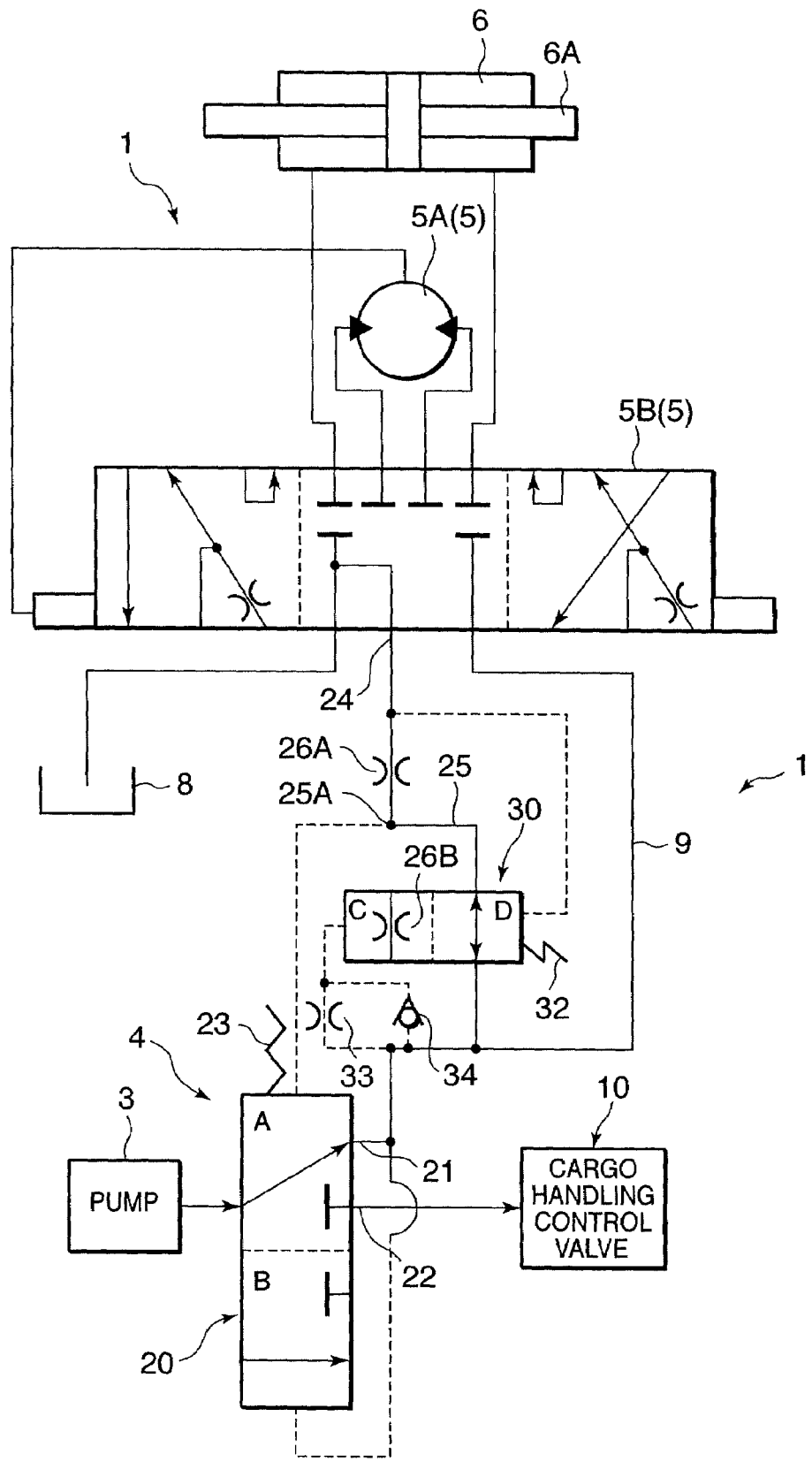
FIG. 5 is an oil circuit diagram of an oil pressure supply circuit according to a second embodiment of this invention.

Referring to FIG. 5, an oil pressure supply circuit according to a second embodiment of this invention will be described.

This embodiment differs from the first embodiment in that the second orifice 26B is integrated into the bypass valve 30 and the bypass valve 30 forms a part of the signal pressure passage 25. With respect to the other components, this embodiment is identical to the first embodiment.

The bypass valve 30 comprises a damping section C and a connecting section D. The connecting section D simply connects the branch point 25A of the signal pressure passage 25 and the power steering oil passage 9 as in the case of the first embodiment. The damping section C connects the branch point 25A of the signal pressure passage 25 to the power steering oil passage 9 via the second orifice 26B integrated therein. In this embodiment, the connecting section D functions as a bypass passage bypassing the second orifice 26B. By thus integrating the second orifice 26B into the bypass valve 30, the composition of the oil pressure supply circuit is made compact and the implementation cost of the oil pressure supply circuit may be reduced.

Figure 6:
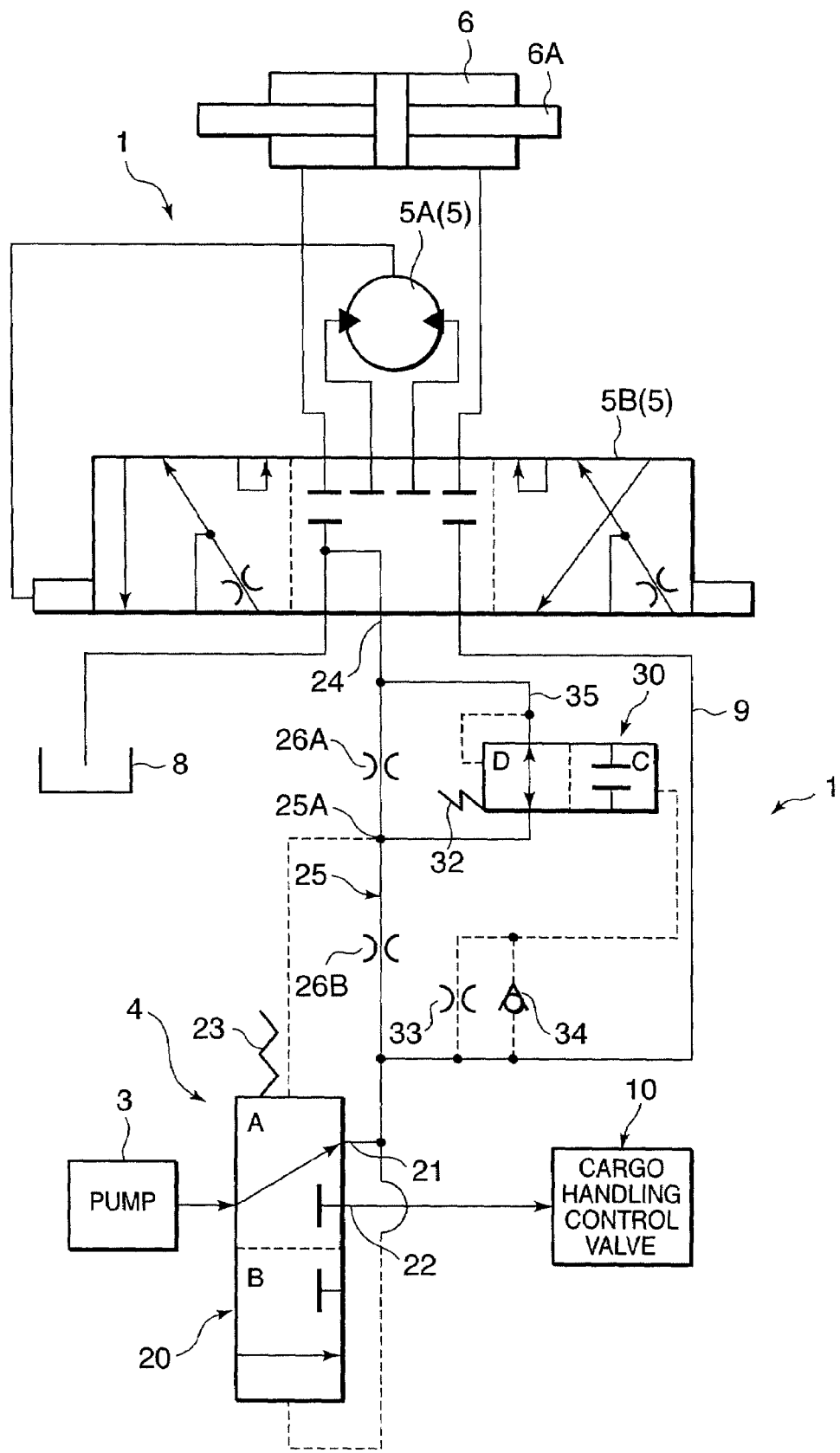
FIG. 6 is an oil circuit diagram of an oil pressure supply circuit according to a third embodiment of this invention.

Referring to FIG. 6, a third embodiment of this invention will be described.

In the first and the second embodiments, the bypass valve 30 was disposed in the bypass passage 31 which bypasses the second orifice 26B disposed between the branch point 25A of the signal pressure passage 25 and the power steering oil passage 9. In contrast, in this embodiment, a bypass passage 35 which bypasses the first orifice 26A disposed between the branch point 25A of the signal pressure passage 25 and the load signal port 24 replaces the bypass passage 31 and the bypass valve 30 disposed in the bypass passage 35 in the first and the second embodiments.

The bypass valve 30 comprises the disconnecting section C and the connecting section D as in the case of the first embodiment. The power steering pressure PS in the power steering oil passage 9 is applied to an end of the valve spool of the bypass valve 30 via the damping orifice 33, and the load signal pressure of the load signal port 24 and the biasing force of the spring 32 are applied to the opposite end of the valve spool of the bypass valve 30. As a result, when the differential pressure between the power steering pressure PS and the load signal pressure is smaller than the biasing force of the spring 32, the bypass valve 30 applies the connecting section D and when the differential pressure is greater than biasing force of the spring 32, the bypass valve 30 applies the disconnecting section C.

When the bypass valve 30 applies the disconnecting section C, the load signal port 24 is connected to the branch point 25A of the signal pressure passage 25 via the first orifice 26A. When the bypass valve 30 applies the connecting section D, the branch point 25A of the signal pressure passage 25 is directly connected to the load signal port 24. Under normal operating conditions, the load signal pressure is equal to or lower than the power steering pressure PS, and hence the bypass valve 30 applies the disconnecting section C such that the first orifice 26A functions to cause a delay in the variation of the pilot pressure LS.

According to this embodiment also, a rapid increase in the power steering pressure is ensured when required.

Figure 7:
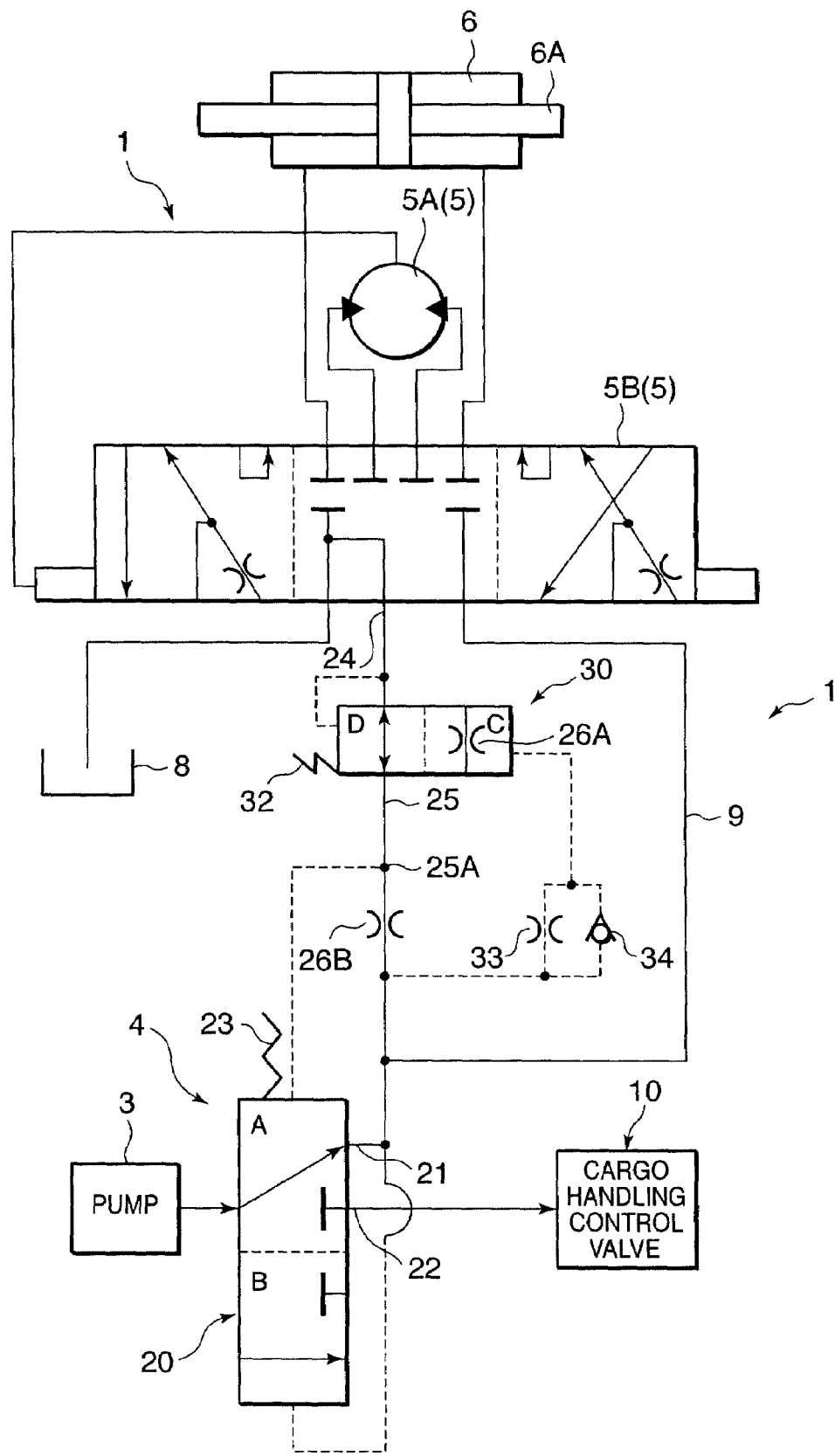
FIG. 7 is an oil circuit diagram of an oil pressure supply circuit according to a fourth embodiment of this invention.

Referring to FIG. 7, a fourth embodiment of this invention will be described.

This embodiment differs from the third embodiment in that the first orifice 26A is integrated into the bypass valve 30 and the bypass valve 30 forms a part of the signal pressure passage 25. With respect to the other components, this embodiment is identical to the third embodiment.

The bypass valve 30 comprises a damping section C and a connecting section D. The connecting section D simply connects the branch point 25A of the signal pressure passage 25 and the load signal port 24 as in the case of the third embodiment. The damping section C connects the branch point 25A to the load signal port 24 via the first orifice 26A integrated therein. In this embodiment, the connecting section D functions as a bypass passage bypassing the first orifice 26A. By thus integrating the first orifice 26A into the bypass valve 30, the composition of the oil pressure supply circuit is made compact and the implementation cost of the oil pressure supply circuit may be reduced.

In each of the third and fourth embodiments, the power steering pressure PS applied to an end of the valve spool of the bypass valve 30 is led to the bypass valve 30 via the damping orifice 33. As a result, when the power steering pressure PS in the power steering oil passage 9 varies, the pressure applied to the end of the valve spool of the bypass valve 30 follows the variation, albeit with some delay. This delay has a preferable effect in stabilizing the action of the bypass valve 30. Further, the check valve 34 is provided in parallel with the damping orifice 33 so as to allow a flow of oil from the end of the valve spool of the bypass valve 30 to the power steering oil passage 9 while preventing a flow of oil from the power steering oil passage 9 to the end of the valve spool of the bypass valve 30. This check valve 34 enables the valve spool of the bypass valve 30 to displace rapidly from the damping section C to the connecting section D. As in the case of the first and second embodiments, the valve spool of the bypass valve 30 according to the third and fourth embodiments displaces rapidly towards the connecting section D, but displaces only gradually towards the damping section C.

The oil pressure supply circuits according to the third and the fourth embodiments function similarly to the prior art device which is not provided with the bypass passage 35 and the bypass valve 30, when the bypass valve 30 is in the damping section C. In contrast, however, when a steering operation is performed in a state where both the power steering device 1 and the cargo handling device 2 are inoperative, or when the cargo handling operation is terminated in a state where both the power steering device 1 and the cargo handling device 2 are operative, the bypass valve 30 rapidly switches to the disconnecting section D due to a rapid decrease in the differential pressure between the power steering pressure PS and the load signal pressure in the load signal port 24. In the disconnecting section D, the bypass valve 30 connects the branch point 25A of the signal pressure passage 25 and the load signal port 24 directly. According to this action, the function of the first orifice 26A which causes a delay in the displacement of the valve spool 20, is disabled, and oil flows from the branch point 25A of the signal pressure passage 25 into the oil chamber applying the pilot pressure LS to the valve spool 20 in the priority flow rate control valve 4 without resistance. The valve spool 20 therefore displaces in a direction for increasing the application ratio of the section A rapidly, and the power steering pressure PS in the power steering oil passage 9 is built up in a short time. A hindrance or a kickback to the operation of the steering wheel 7 is therefore prevented from occurring.

In each of the embodiments described above, pressurized oil supplied from the priority flow rate control valve 4 to the cargo handling control valve 10 is recirculated to the oil tank 8 when the lift control valve 13 and the tilt control valve 14 are both in the neutral section. However, it is possible to incorporate a back pressure mechanism into the oil pressure supply circuit such that the oil recirculated from the cargo handling control valve 10 to the oil tank 8 generates a back pressure. The back pressure generating mechanism may be constituted by a fixed orifice or a relief valve which opens at a predetermined pressure. A variable orifice which enlarges the flow cross sectional area according to an increase in the flow rate of the recirculated oil may also constitute the back pressure generating mechanism.

By providing the back pressure generating mechanism, the pressure of pressurized oil supplied to the cargo handling device 10 in a state where the oil is recirculated to the oil tank 8 due to the termination of the cargo handling operation, can be controlled to a desired level. By thus maintaining the pressure level of the recirculated oil to the oil tank 8, an abrupt fall of the steering pressure PS in the power steering oil passage 9 when the cargo handling operation is terminated can be prevented. By combining such a back pressure generating mechanism with the bypass valve 30 which temporarily disables the function of the first orifice 26A or the second orifice 26B, the supplied oil pressure to the power steering device 1 can be maintained at a predetermined pressure level without failure. Incorporating a back pressure generating mechanism into the oil pressure supply circuit is useful for further preventing a kickback from occurring when the operation of the steering wheel 7 is performed immediately after terminating cargo handling operation.

It is also preferable to provide the oil pressure supply circuit with a bypass passage which causes the oil supplied from the overflow outflow port 22 to bypass the cargo handling control valve 10 and flow into the oil tank 8 directly, and an unload valve which is disposed in the bypass passage so as to close the bypass passage when the cargo handling control valve 10 is operative and open when the cargo handling control valve 10 is switched to the neutral section with some delay. When cargo handling is not underway, the unload valve recirculates the oil supplied from the overflow outflow port 22 to the oil tank 8 by bypassing the cargo handling control valve 10. Pressure loss in the oil when it passes through the cargo handling control valve 10 can thereby be avoided. Further, when the cargo handling operation is terminated, the unload valve closes with a delay, thereby preventing a rapid decrease in the pressures in the overflow outflow port 22 and the priority outflow port 21. As a result, kickback can be further prevented from occurring when the power steering device 1 is operated immediately after the termination of a cargo handling operation.

Further, if the unload valve is closed in a state where the operation of the power steering device 1 has been started, and maintained in a closed state as long as the steering operation is continued, all of the oil supplied to the inoperative cargo handling device 2 flows through the back pressure generating mechanism. Consequently, the pressure in the overflow outflow port 22 located upstream of the cargo handling valve 10 increases rapidly and induces an increase in the discharge pressure of the oil pump 3. Due to this increase in the discharge pressure, the flow rate of the pressurized oil supplied to the power steering device 1 increases, and the differential pressure between the power steering pressure PS in the power steering oil passage 9 and the pilot pressure LS at the branch point 25A increases. An increase in the differential pressure causes the valve spool 20 of the priority flow rate control valve 4 to displace in a direction for increasing the application ratio of the section A. Due to this displacement of the valve spool 20, the flow rate of the oil distributed to the priority outflow port 21 increases greatly and the power steering device 1 is provided with a sufficient flow rate of pressurized oil. A hindrance to the operation of the steering wheel 7 is thereby prevented without failure.

In the embodiments described above, the oil pump 3 is driven by an internal combustion engine. However, this invention is applicable to an oil pressure supply circuit in which the oil pump is driven by an electric motor. In a device in which the electric motor is permanently operated in order to ensure a sufficient flow rate of pressurized oil to the power steering device, the power steering pressure can be increased to satisfy the requirements of the power steering device, as in the case of the oil pressure supply circuit in which the oil pump is driven by an internal combustion engine.

Figure 8:
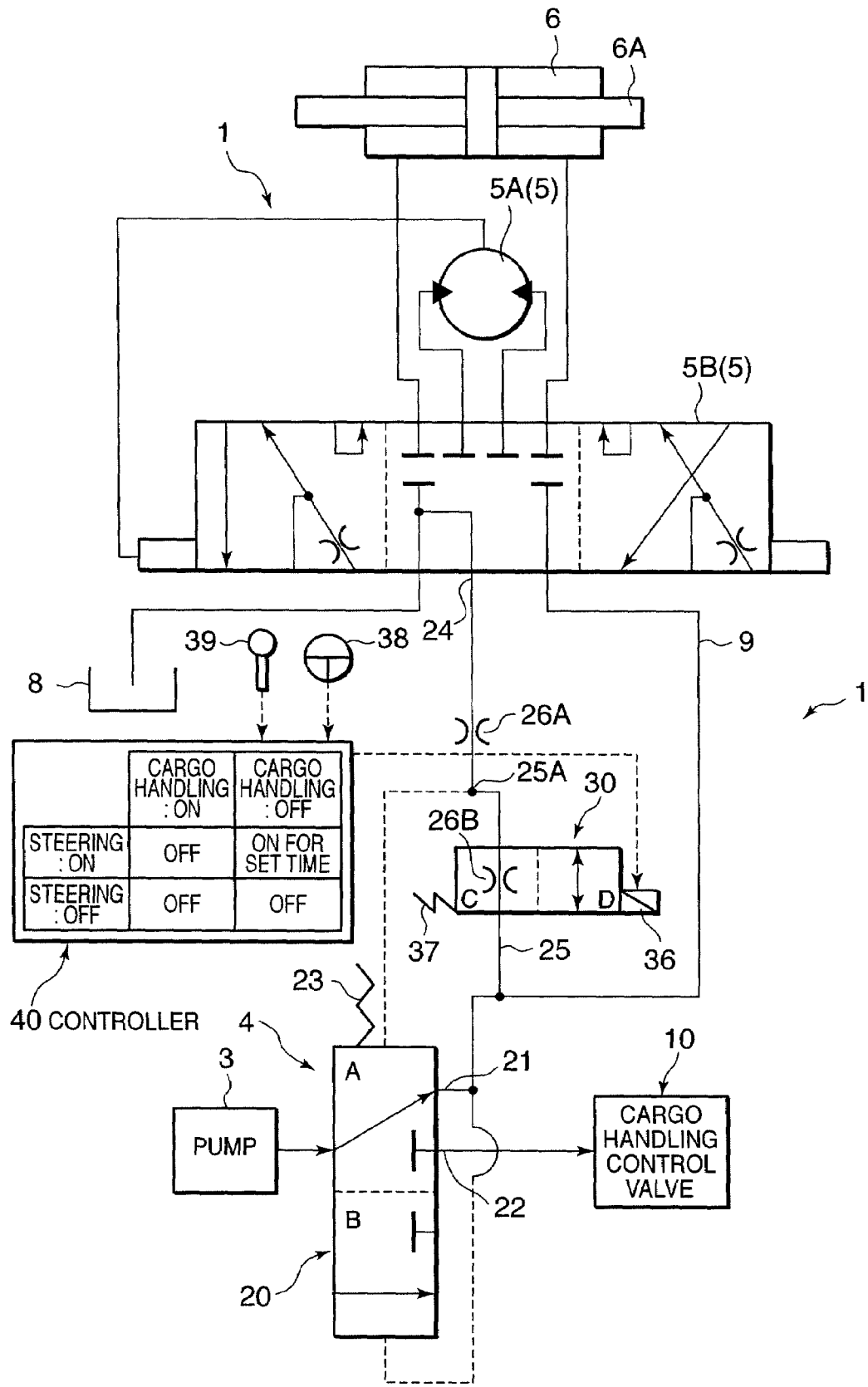
FIG. 8 is an oil circuit diagram of an oil pressure supply circuit according to a fifth embodiment of this invention.

Referring to FIG. 8 a fifth embodiment of this invention will be described.

This embodiment corresponds to the oil pressure supply circuit according to the second embodiment wherein the bypass valve 30 is constituted by a solenoid valve. By constituting the bypass valve 30 by a solenoid valve, the oil circuit used in the second embodiment for applying oil pressure to the valve spool of the bypass valve 30 including the damping orifice 33 and the check valve 34 is omitted in this embodiment.

The bypass valve 30 operates in response to energization of a solenoid 36, and maintains the disconnecting section C due to a biasing force of a spring 37 when the solenoid 36 is not energized. When the solenoid 36 is energized, the bypass valve 30 switches to the connecting section D against the biasing force of the spring 37, and connects the branch point 25A of the signal pressure passage 25 directly to the power steering oil passage 9.

The oil pressure supply circuit according to this embodiment further comprises a steering sensor 38 which detects a steering operation of the steering wheel 7 and outputs a corresponding signal, a cargo handling sensor 39 which detects operations of the lift control lever 15A and the tilt control lever 15B and outputs a corresponding signal, and a controller 40 which outputs an energizing command to the solenoid 36 in response to the signals input from the sensors 38, 39.

The controller 40 is programmed to determine if the current situation corresponds to a case in which the steering signal has turned On in a state where both the steering signal and the cargo handling signal are Off, or a case in which the cargo handling signal has turned Off in a state where both the steering signal and the cargo handling signal are On, based on the signals input from the sensors 38, 39. The controller 40 is also programmed to output the energizing command to the solenoid 36 for a predetermined time period when the current situation corresponds to any of the above cases. The other components of the oil pressure supply circuit are identical to those of the second embodiment.

In this oil pressure supply circuit, since the bypass valve 30 is switched by the solenoid 36, stability in the switching operation of the bypass valve 30 can be enhanced in comparison with the other embodiments in which bypass valve 30 is switched depending on the oil pressure. Especially in a cold region or in winter, when the viscosity of working oil is increased due to low temperatures, build-up of the pilot pressure tends to be late. Switching of the bypass valve 30 using the pilot pressure also has a delay. By using the solenoid 36 to switch the bypass valve 30, such a disadvantage caused by low temperatures can be eliminated.

In this oil pressure supply circuit, the bypass valve 30 is disposed between the branch point 25A of the signal pressure passage 25 and the power steering oil passage 9 as in the case of the second embodiment. However, it is possible to constitute the bypass valve 30 of the fourth embodiment, which is disposed between the branch point 25A of the signal pressure passage 25 and the load signal port 24, by a solenoid valve.

The contents of Tokugan 2006-246610, with a filing date of Sep. 12, 2006 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, in the embodiments described above, this invention is applied to an oil pressure supply circuit for a fork-lift truck, but this invention can be applied to an oil pressure supply circuit for any kind of industrial vehicle which drives a power steering device 1 and a cargo handling device 2 using pressurized oil from a single oil pump 3.

The embodiments of this invention in which an exclusive property or privilege is claimed are defined as follows:

What is claimed is:

1. An oil pressure supply circuit which supplies pressurized oil to an oil pressure power steering device and a cargo handling device of an industrial vehicle, comprising:
   an oil pump which discharges pressurized oil;
   a power steering oil passage which supplies pressurized oil to the power steering device;
   a load signal port which outputs a load pressure exerted on the power steering device, the load signal port being released to an oil tank when the power steering device is not operative;
   a signal pressure passage which connects the load signal port and the power steering oil passage, the signal pressure passage comprising a first orifice and a second orifice which are disposed in series such that the first orifice is disposed nearer to the load signal port than the second orifice;
   a priority flow rate control valve which preferentially distributes the pressurized oil discharged by the oil pump to the power steering oil passage, and distributes excess oil to the cargo handling device, the priority flow rate control valve being configured to increase a distribution ratio of the pressurized oil to the power steering oil passage as a differential pressure between the power steering oil passage and the signal pressure passage between the first orifice and the second orifice decreases;
   a bypass passage which bypasses one of the first orifice and the second orifice; and
   a bypass valve which opens and closes the bypass passage.

2. The oil pressure supply circuit as defined in claim 1, further comprising a third orifice which introduces the pressure in the power steering oil passage to the bypass valve, wherein the bypass valve is configured to open the bypass passage when a differential pressure between the load signal port and the pressure introduced from the power steering oil passage via the third orifice is lower than a predetermined value.

3. The oil pressure supply circuit as defined in claim 2, wherein the bypass passage is configured to bypass the second orifice.

4. The oil pressure supply circuit as defined in claim 3, wherein the second orifice and the bypass passage are integrated into the bypass valve, and the bypass valve is configured to activate the bypass passage when the differential pressure between the load signal port and the pressure introduced from the power steering oil passage via the third orifice is lower than the predetermined value, and activate the second orifice when the differential pressure between the load signal port and the pressure introduced from the power steering oil passage via the third orifice is not lower than the predetermined pressure.

5. The oil pressure supply circuit as defined in claim 2, wherein the bypass passage is configured to bypass the first orifice.

6. The oil pressure supply circuit as defined in claim 5, wherein the first orifice and the bypass passage are integrated into the bypass valve, and the bypass valve is configured to apply the bypass passage when the differential pressure between the load signal port and the pressure introduced from the power steering oil passage via the third orifice is lower than the predetermined value, and activate the second orifice when the differential pressure between the load signal port and the pressure introduced from the power steering oil passage via the third orifice is not lower than the predetermined pressure.

7. The oil pressure supply circuit as defined in claim 2, further comprising a check valve which releases the pressure introduced from the power steering oil passage via the third orifice to the power steering oil passage.

8. The oil pressure supply circuit as defined in claim 1, further comprising a steering sensor which outputs a steering signal when the power steering device is operative, a cargo handling sensor which outputs a cargo handling signal when the cargo handling device is operative, and a controller which controls opening and closing of the bypass valve on the basis of the steering signal and the cargo handling signal so as to open the bypass valve for a predetermined time period when the steering signal has switched to On in a state where the steering signal and the cargo handling signal are both Off, or when the cargo handling signal has switched to Off in a state where the steering signal and the cargo handling signal are both On, and close the bypass valve in other situations.

* * * * *

UNITED STATES PATENT AND TRADEMARK OFFICE
CERTIFICATE OF CORRECTION

PATENT NO. : 7,600,463 B2  Page 1 of 1
APPLICATION NO. : 11/843319
DATED : October 13, 2009
INVENTOR(S) : Kooriyama It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by 259 days Delete the phrase "by 259 days" and insert -- by 233 days --

Signed and Sealed this

Twentieth Day of April, 2010

David J. Kappos
*Director of the United States Patent and Trademark Office*